United States Patent
Rhysing (10) Patent No.: US 10,941,882 B1
(45) Date of Patent: Mar. 9, 2021

(54) INTER-CONNECTING CLAMP LOCKING MECHANISM AND GRIP CHANNEL

(71) Applicant: Daryian Rhysing, Troy, NY (US)

(72) Inventor: Daryian Rhysing, Troy, NY (US)

(73) Assignee: RENSSELAER POLYTECHNIC INSTITUTE, Troy, NY (US)

( * ) Notice: Subject to any disclaimer, the term of this patent is extended or adjusted under 35 U.S.C. 154(b) by 0 days.

(21) Appl. No.: 16/004,855

(22) Filed: Jun. 11, 2018

Related U.S. Application Data (60) Provisional application No. 62/519,459, filed on Jun. 14, 2017.

(51) Int. Cl.
*F16L 3/10* (2006.01)

(52) U.S. Cl.
CPC .................. *F16L 3/1091* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,310,622 A * | 2/1943 | Ellinwood | ............ | F16L 3/1233 174/40 CC |
| 4,442,994 A * | 4/1984 | Logsdon | ............ | F16L 3/12 248/547 |
| 5,406,032 A * | 4/1995 | Clayton | ............ | H02G 3/083 174/151 |
| 5,612,509 A * | 3/1997 | Market | ............ | H02G 3/26 174/53 |
| 5,660,564 A * | 8/1997 | Yamanashi | ............ | H01R 13/741 439/556 |
| 6,241,199 B1 * | 6/2001 | Ismert | ............ | F16L 59/024 248/56 |
| 6,446,915 B1 * | 9/2002 | Ismert | ............ | F16L 3/24 248/68.1 |
| 6,561,471 B1 * | 5/2003 | Hawie | ............ | A01K 97/10 211/60.1 |
| 7,007,900 B2 * | 3/2006 | Goodwin | ............ | H02G 7/053 248/68.1 |
| 7,909,369 B2 * | 3/2011 | Kertesz | ............ | F16L 37/0842 285/406 |
| 7,915,545 B1 * | 3/2011 | Bixler | ............ | H02G 3/083 174/653 |
| 8,342,474 B2 * | 1/2013 | Gilbreath | ............ | F16L 3/222 165/162 |
| 8,408,933 B2 * | 4/2013 | Myong | ............ | H01R 4/01 439/358 |
| 8,708,289 B2 * | 4/2014 | Allenbach | ............ | F16L 3/2235 248/68.1 |
| 8,759,682 B2 * | 6/2014 | Devouge | ............ | F16L 3/12 174/135 |
| 9,590,401 B2 * | 3/2017 | Landry | ............ | H02G 3/32 |
| 9,825,395 B2 * | 11/2017 | Gooch | ............ | H01R 13/447 |
| 9,837,185 B2 * | 12/2017 | Korczak | ............ | H01B 7/40 |
| 10,283,950 B2 * | 5/2019 | Gintz | ............ | H02G 3/32 |

(Continued)

OTHER PUBLICATIONS

Amphenol Corp, Monolithic thermoplastic p-clamp with cushion and locking mechanism, Dec. 12, 2015, Patent US20170167635A1.

*Primary Examiner* — Monica E Millner
(74) *Attorney, Agent, or Firm* — Brown & Michaels, PC (57) ABSTRACT

The technology is a securing device for electrical wiring and other mechanical components to the frame or other wire bundles without the use of metallic hardware.

5 Claims, 12 Drawing Sheets

(56) References Cited

U.S. PATENT DOCUMENTS

| | | | |
|---|---|---|---|
| 10,378,679 B2* | 8/2019 | Booth | F16L 3/1091 |
| 2014/0151514 A1* | 6/2014 | Asai | B60R 16/0215 |
| | | | 248/74.1 |
| 2014/0299722 A1* | 10/2014 | Sampson | F16L 3/1058 |
| | | | 248/74.2 |
| 2016/0207635 A1* | 7/2016 | Yokoi | B64D 45/00 |

* cited by examiner

INTER-CONNECTING CLAMP LOCKING MECHANISM AND GRIP CHANNEL

CROSS REFERENCE TO RELATED APPLICATIONS

This application claims the benefit of a prior provisional application with No. 62/519,459, filed on Jun. 14, 2017.

FIELD OF INVENTION

The technology relates to a method and apparatus comprised of an interconnecting clamp in an aircraft for securing wiring harnesses. Furthermore, the device pertains to the general field of aviation manufacturing fastening devices, especially a clamp, and has certain specific application to aircraft electrical wiring. More particularly, the present technology relates to attaching wirings and other mechanical components such as tubing, piping or other equipment requiring a substantially circular clamp. Additionally, the device makes use of a novelty ergonomic hand tool for the disassembly of the embodiment herein.

BACKGROUND OF THE INVENTION

Wire bundles that may have been exposed to hydraulic fluid require special attention during aircraft inspections. Hydraulic fluid and other external factors are very damaging to connector grommets and wire bundle clamps, leading to indirect damage, such as arcing and chafing.

Through the continual motion of the aircraft and the use of chemicals, such as hydraulic fluid, oils, or washing detergents, the wire bundles may chafe and the rubber sleeve may erode and expose the wires to the sharp metal edge of the clamp.

Wiring exposed to high heat can accelerate degradation, insulation dryness, and cracking. Direct contact with a high heat source can quickly damage insulation. Even low levels of heat can degrade aircraft wiring over long periods of time.

Clamps not installed properly can further accelerate the wiring degradation process. Improper routing, clamping, and terminating during initial installation or during a modification can lead to damage.

Due to limitations and the dangers inherent with the current design, it would be highly desirable to redesign the compression clamp.

The subject matter disclosed herein relates to clamping aircraft wiring, in particular, a mechanical device used in the art to secure components. More particularly, the interconnecting clamp is used to hold or tightly secure objects together, in order to prevent their movement or separation by application of an inward force. As an example, in U.S. Provisional Patent Applications 2017/0167635A1, U.S. Pat. Nos. 1,782,266, and 7,216,862, the clamp is generally designed as a metal clamp or plastic produced from a single long piece. The single piece is bent into a form comprised of a circular arc, with the opposite ends of the piece coming together to close the circular arc. The end pieces of the clamp are fastened together using a screw or bolt.

Existing clamps are metal, nonmetal, or metal covered by a rubber component for improved grip. These clamps use hardware and are difficult to install around one or more longitudinal elements, like bundles of wires, tubing, or other similar materials. However, these clamps are difficult to replace and they have led to severe strain injuries of the hands, such as carpal tunnel syndrome. One model of a clamp made by Amphenol has a hinge making this process less difficult and faster, nevertheless, it continues to use hardware for installation affecting the strain injuries among the workforce. Furthermore, there is a need for a clamp with a slide channel for improved grip assembly and easy replacement, a one size that can fit grips of different diameters so that a damaged grip can be switched to accommodate more or less wires without the need to dispose of the clamp itself. Such clamps with interchangeable grips may also allow for easy replacement of material and potential reduction of Repetitive Strain Injuries (RSI), such that each interconnecting clamp offers multiple options for a user.

The current clamp in use is a metal clamp used to hold bundles of electrical wires and fuel lines. There are inherent problems with the material and the design of this original clamp, the material is conductive and can lead to arcing, and the design requires the technicians to pull it apart causing injuries to the hands. Additionally, the need for a bolt/screw, washer, and nut to attach the clamp to the aircraft opens up for the possibility of Foreign Object Damage (FOD).

SUMMARY OF THE EMBODIMENTS

The device is designed as two halves made of thermoplastics and comprised of one or more complementary snap-fit tabs that interlock together and rest flush against one another in a manner that lines up one half with its respective complementary snap-fit tab or tabs with the hole of the second half with secondary complementary snap-fit tab or tabs, FIGS. 3, 4, 5, 15, 20, and 24. The securing device may include a grip to improve the securing functionality of the device, FIGS. 7, 8, 15, and 16.

Figure 11:
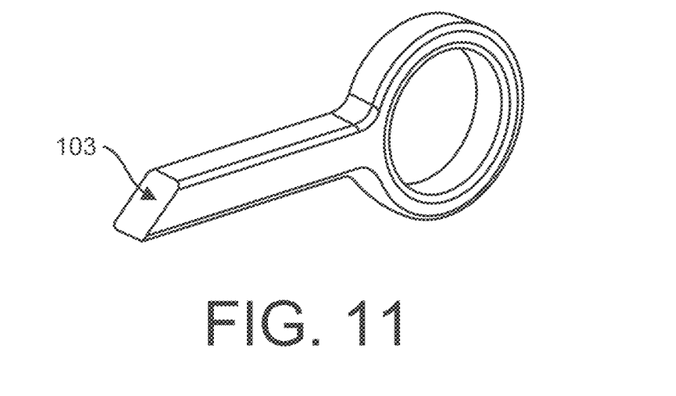
FIGS. 11 and 23 illustrate a disassembly tool for unlatching interconnecting clamp embodiments.

The device is therefore an object of the exemplary embodiments disclosed herein to alleviate the disadvantages in the art and provide an interconnecting clamp that is molded from a combination of thermoplastics and rubber components in order to provide a lightweight but sturdy circumferential clamping device. The disassembly tool, FIGS. 11 and 23, fits easily into a hand fingers to reach areas and allows the technician to depress the snap-fits of the smart clamp with one hand and without much use of force.

The tool is able to depress the snap-fits of the clamp thus allowing the two halves of the interconnecting clamp to disengage from each other. The disassembly tool is comfortably designed to be used over an extended amount of time. To prevent the tool from becoming an FOD should it be dropped, a technician could secure it to their person through a small loop that may accommodate the addition of a keychain or tether, FIG. 23.

The new technology introduced as the interconnecting clamp, allows easy replacement and installation of wire bundles by eliminating the stress placed in the hands and wrists.

The interconnecting clamp (ICC) is designed to reduce the stress traditional clamps and hand tools put on wrist muscles safely and securely. In addition, the ICC is engineered to substantially reduce the weight of applied tools, which is in the user's hand, to further reduce fatigue. Because of the ability of interconnecting through a snapping mechanism, the ICC itself is very light and compact, enabling it to operate in tight spaces where other hand tools cannot reach. Because there is minimal manual or physical force required, the ICC design dramatically reduces the risk of carpal tunnel syndrome that can occur with repetitive hand crimping. By significantly reducing muscle fatigue, the ICC can lead to increased productivity over traditional hand crimping tools. The ICC saves up to $20 billion annually on workers' compensation costs, lost productivity, employee turnover, and other indirect expenses. It cuts installation time in half, saving maintenance costs on the ground, and saving an average in fuel of $32 rotor-$170 fixed wing per hour in the air due to weight reduction. Compared to existing clamp, the ICC saves weight, an average of 75% in weight from incumbent. The ICC improves safety, it reduces the occurrence of lost/foreign items and the threat of fire due to electric shorts.

In one aspect of the technology, the securing device is designed as a half embodiment comprised of one or two snap-fit tabs and one or two apertures to fit the snap-fit tabs of a second half embodiment, FIGS. 4, 5, 15, and 24. In such design, the top body terminates in a first complementary snap tab and may have an aperture to fit an opposite snap-fit tab while the bottom of the component may terminate in a second complementary snap-fit tab or an aperture to fit a second half embodiment accordingly. The first complementary tab fits in a second half body's depression and forms a locking support as a latch, FIGS. 4, 6, and 20. The first complementary tab and the second complementary tab interlock together and rest flush against one another in a manner that lines up the hole of the first complementary tab with the hole of the second complementary tab.

Different materials are chosen for the embodiments. The Interconnecting clamp is made of thermoplastics and the inner grip is over-molded or fused onto the clamp. The grip of protective material contains silicone. The grip can be ribbed. The ICC allows for additional interconnection through extruding cylindrical clips of snapping mechanism. The ICC rails can be attached to the frame by additional non-metallic mounting brackets with fasteners. The ICC clip can also be attached to another ICC by fixed mounting cylinders. Circular openings around the corners of the device allow for additional fastening between ICCs through approved FAA strap ties. The clamp can be made of Celazole PBI (grade U-60—Compression-Molded 100% PBI) and other similar thermoplastic materials. The protective grip extends along the concave internal face of the clamp. Each mutually opposed halves of the clamp are provided with two tabs and two orifices for closing the clamp and attaching it to the structural mount or inter-connecting it to another clamp of the same kind. The clamp can include, at the region of connection with the snap/tabs, an increased thickness and localized recesses at the region of connection.

The material chosen for some of these ICC devices and depending on aircraft location is Celazole PBI (grade U-60—Compression-Molded 100% PBI) due to its role as the highest performance engineering thermoplastic available today. It offers the highest heat resistance and mechanical property retention over 400° F. of any unfilled plastic. Celazole PBI has better wear resistance and load carrying capabilities at extreme temperatures than any other engineering plastic.

The interconnecting clamp is manufactured through 3D printing or injection molding. U-60 is commonly molded into precision parts for aerospace. Celazole PBI is very "clean" in terms of ionic impurity and it does not outgas (except water and has excellent ultrasonic transparency. Celazole PBI is also an excellent thermal insulator. Therefore, the ICC exhibits the following attributes: heat resistance, high-purity, ultrasonic transparency, and is an excellent Insulator.

In another aspect of the invention, the securing device encloses a grip. The grip may be made up of a latex polymer or elastomer, a synthetic polymer, or any combination thereof. In yet other aspects of the invention, the internal face of the grip is ribbed or grooved in order to compress more easily, form a better grip, and/or accommodate multiple diameters of wiring bundles. In yet other aspects of the invention, the holes through the top and bottom of each half embodiment corners are inserted to allow for better fastening using a strap tie.

Other aspects of the device also include a grip that additionally has an outer grove that sits flush against the interior surface or channel of the opposite side of the grip when the securing device is interlocked.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

A more complete appreciation of the invention and many of the attendant advantages thereof will be readily obtained as the same becomes better understood by reference to the following detailed description of the invention by reference to certain embodiments when considered in connection with the accompanying drawings.

It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAIL DESCRIPTION OF SPECIFIC EMBODIMENTS

The interconnecting clamp 100 is an efficient tool to enable securing of the wiring in tight spaces where other hand tools cannot reach. Because there is minimal manual or physical force required, the interconnecting clamp design reduces the risk of Repetitive Strain Injuries (RSI) that can occur with monotonous hand crimping.

The following is a detailed description of exemplary embodiments to illustrate the principles of the invention. In describing an embodiment of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several embodiments of the invention are described for illustrative purposes, it being understood that the invention may be embodied in other forms not specifically shown in the drawings. Therefore, the embodiments are provided to illustrate aspects of the invention, but the invention is not limited to any embodiment. The scope of the invention encompasses numerous alternatives, modifications and equivalent. Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

Mechanical Component

Figure 1:
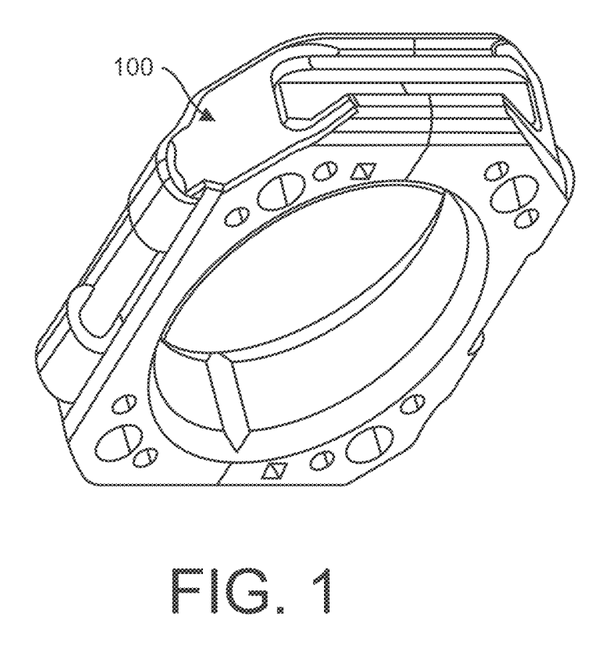
FIG. 1 is a diagram of an exemplary smart clamp assembly.
Figure 2:
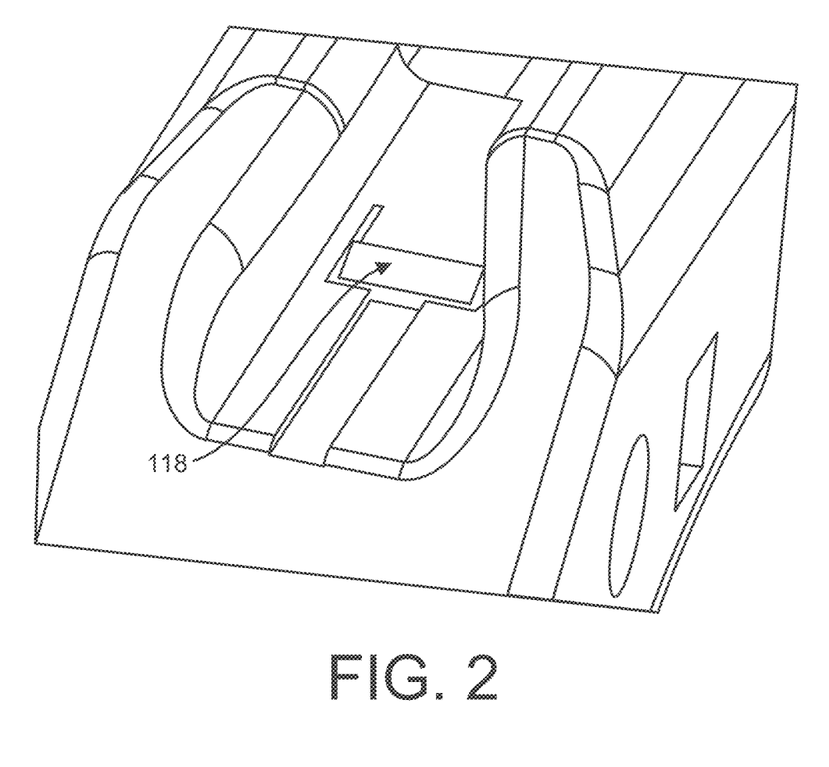
FIGS. 2 and 6 illustrate the locking mechanism from a half embodiment.

FIG. 1 illustrates an overview of an embodiment. It is a one-quarter view of the interconnecting clamp assembly 100 in accordance with an exemplary embodiment of the invention. The fastening mechanism is an interconnecting clamp having a semicircular plastic body, FIG. 4, which has an inner face and an outer face. The semicircular plastic body is further comprised of a curved body channel, one or two complementary snap-fit tab assemblies 102, and a second semicircular plastic half that may or may not be identical to the first half assembly.

Figure 23:
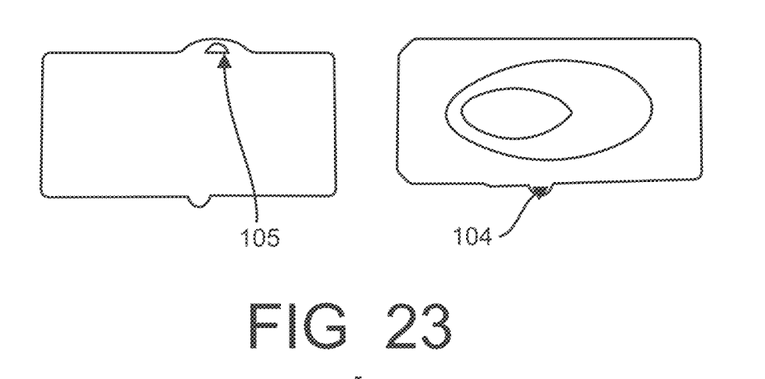
Figure 24:
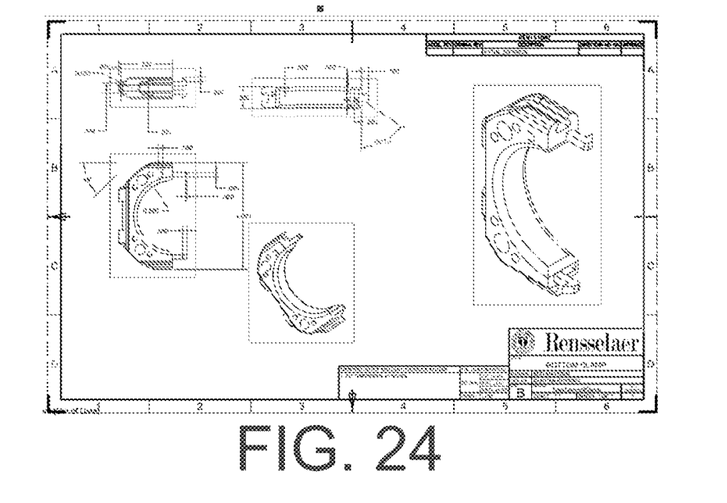
FIG. 24 illustrates an interconnecting clamp diagram.

The plastics used in the smart clamp are advantageous over metallic securing devices because they are lighter, easier to install, easier to bend, and retain equivalent securing strength. The curved body portion of the interconnecting clamp 101 is further comprised of a first end top portion and a second end bottom portion opposite the first end top portion. The top portion is operably attached to the first complementary snap-fit tab assembly 102. The bottom portion may be operably attached to a second complementary snap-fit tab assembly or may not have a second complementary snap-fit tab assembly, FIGS. 4 and 15. The top portion and the bottom portion of the curved body may be integrally formed with the first complementary snap-fit tab assembly and the lower snap-fit tab assembly respectively. The tab 104 on the disassembly tool, FIG. 23, is able to depress the snap-tabs in some way so as to allow the clamp halves to come apart. To prevent the tool from becoming loose, a technician could secure it to their person through a small loop 105 that may accommodate the addition of a keychain or tether.

The top and bottom portions with complementary snap-fit tab assemblies 102 are comprised with a locking support 106 in the form of an aperture that is drilled, machined, or molded through the smart clamp assembly. The locking support projects inward from the edge of the surface. In certain embodiments, the snap-fit tabs may appear to have a wedge-like shape 107. Alternative embodiments may have locking support or snap-fit tabs at a front portion that terminates in a latch forward and outward from a side of the semicircular smart clamp surface.

Figure 12:
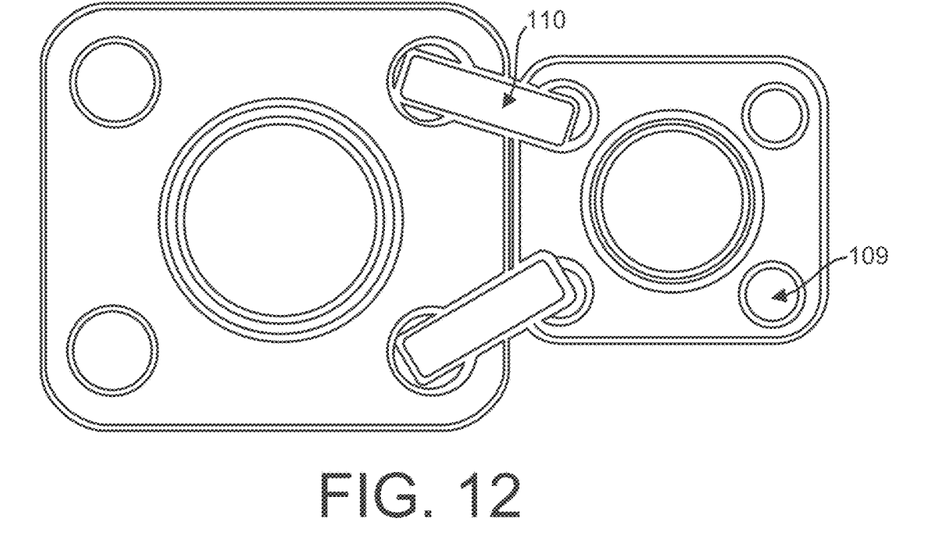
FIG. 12 is a diagram that illustrates how strap ties can be used through the clamp openings.
Figure 13:
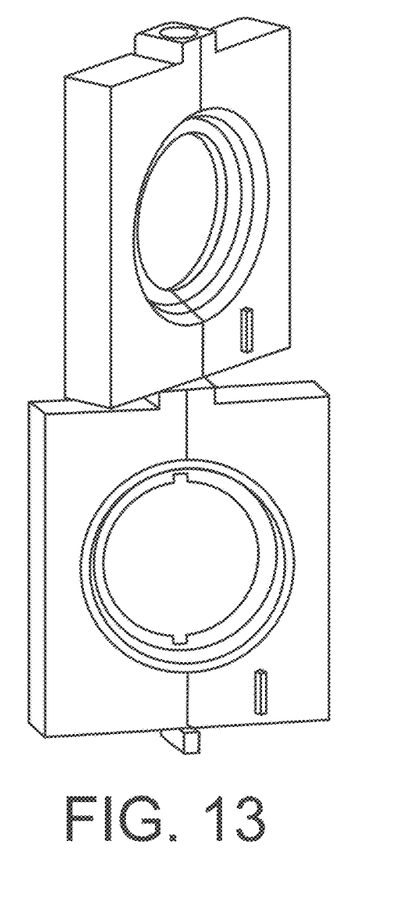
FIG. 13 illustrates a pair of clamps interconnected to each other with rotation option.
Figure 14:
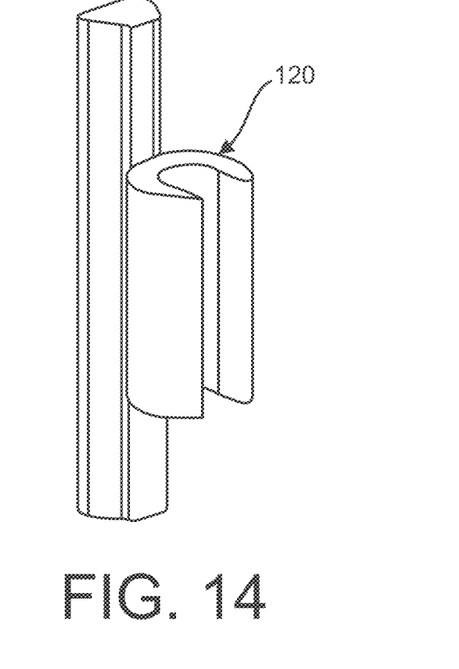
FIG. 14 illustrates a snapping clip assembly.
Figure 15:
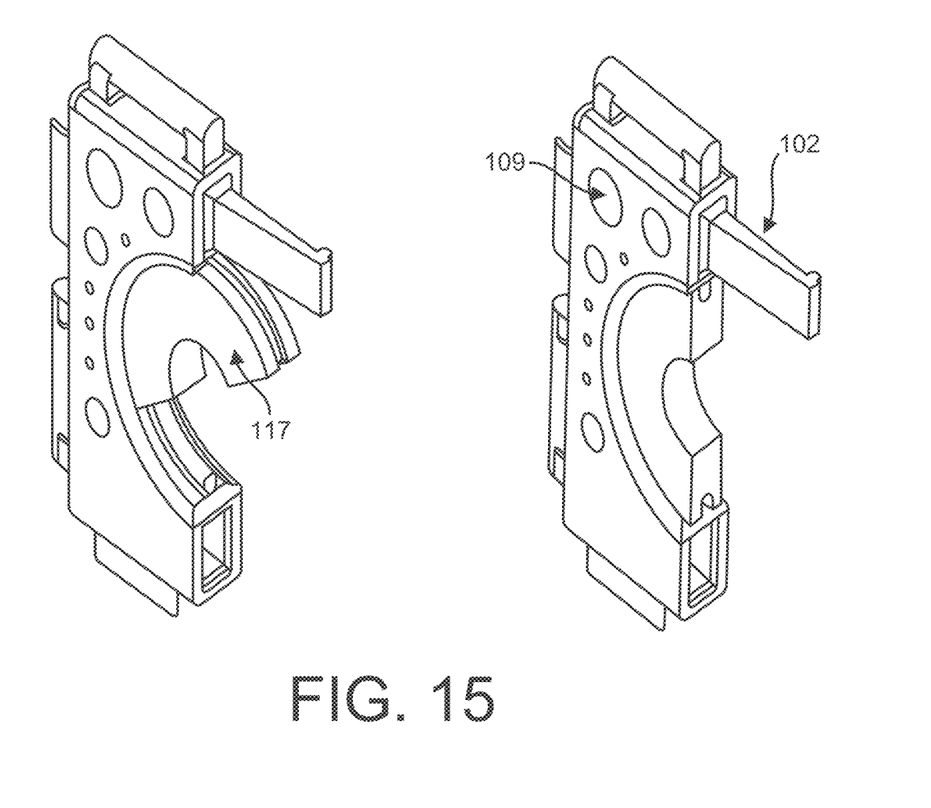
FIGS. 15 and 16 illustrate an interconnecting sliding grip.
Figure 16:
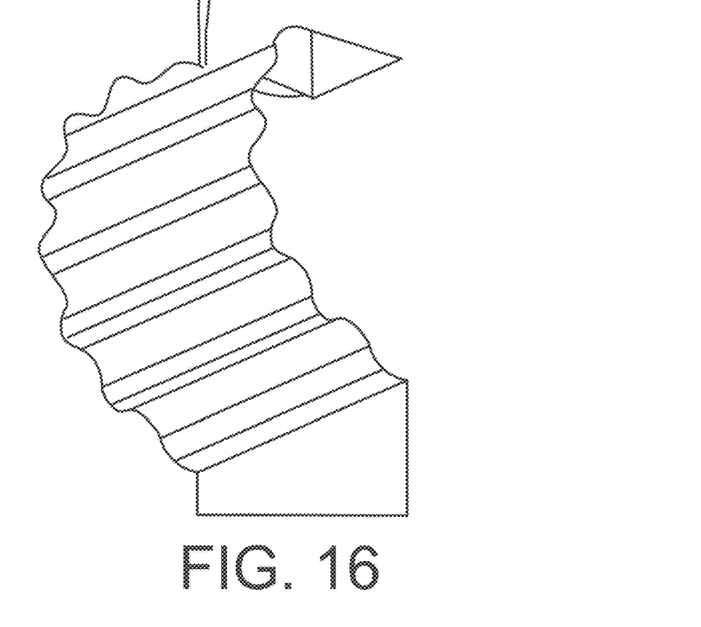
Figure 17:
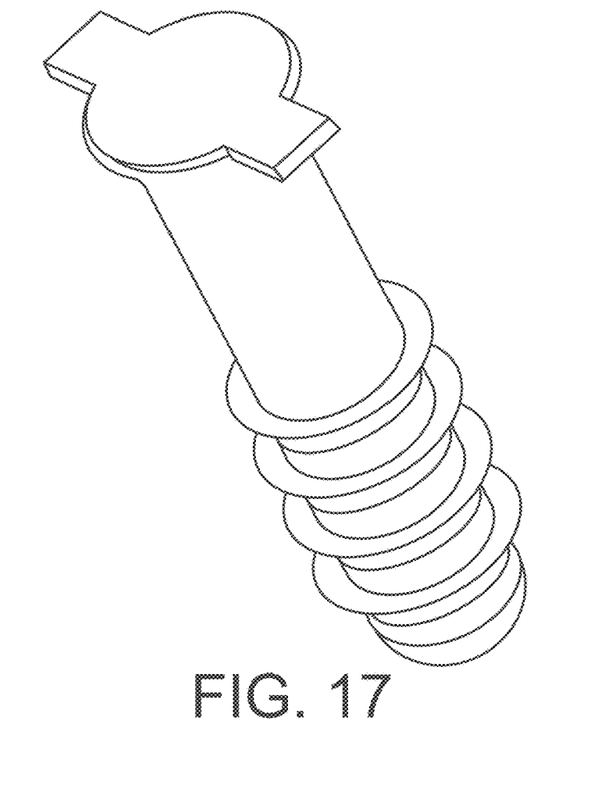
FIGS. 17 and 18 illustrate a non-metallic fastener post and nut.
Figure 18:
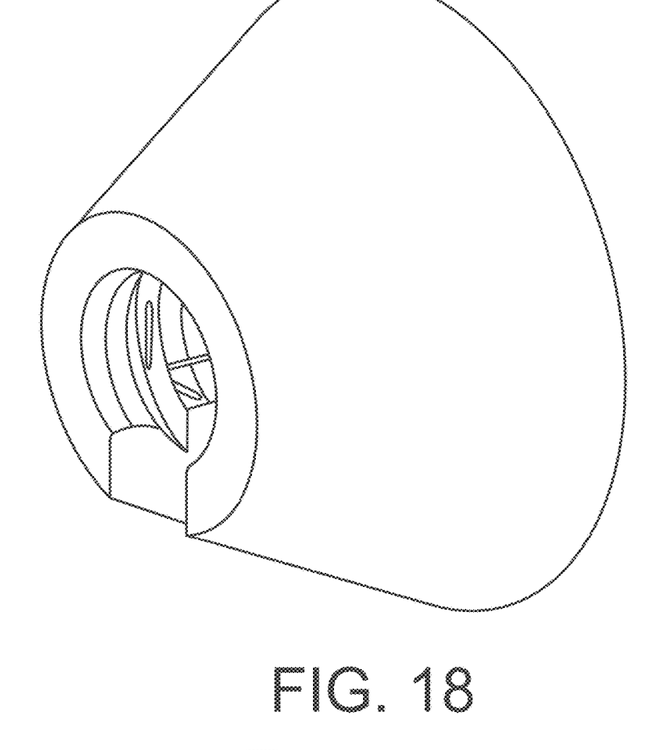
Figure 19:
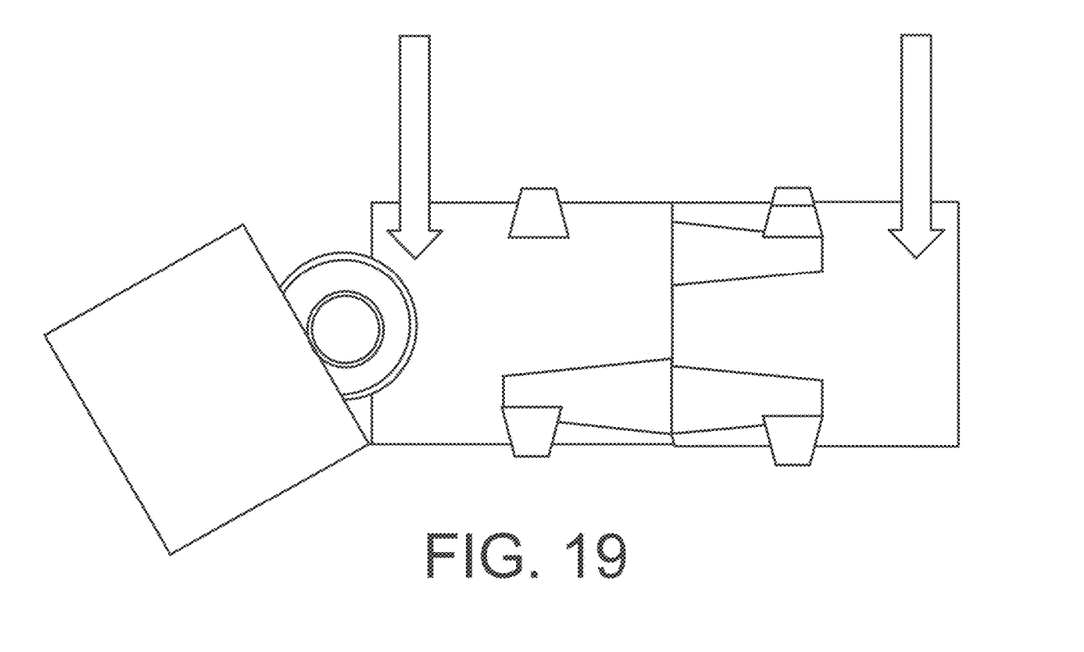
FIG. 19 illustrates stability followed by an example of four existing snap/tabs in response to external forces applied to an interconnecting clamp.
Figure 20:
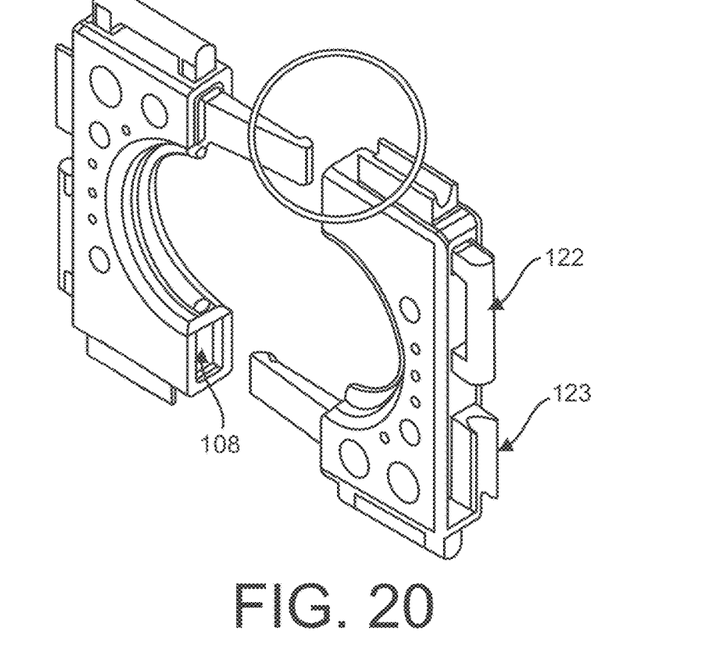
FIG. 20 illustrates two half embodiments assembly with only one snap tab on each body.

A hole 108 is drilled, machined, or molded through the smart clamp surface to latch the complementary snap-fit tabs. Additional holes 109 are designed to accommodate a strap tie 110, or other fastener, FIG. 12. The holes may be of a variable diameter, depending on the type of fastener used. It will be readily apparent to one of ordinary skill in the art that the hole may be of any shape that can accommodate a fastening device such as a snap-fit tab 102 or pressure fastener 111.

The interconnecting clamp assembly 100 may have a raised channel 112 on one side and a grove 113 on the opposite side that when slide together with a second half assembly it interlocks in place. The channel provides additional structural support at a point of stress for the curved body. The inner side of the clamp assembly has a second raised channel 114 to fit a grip 115, 116, and 117. This channel is preferably molded in a substantially semicircular shape that is suited to receive a grip that slides through with the aid of a fingertip of an individual pressing against it to bring the clamp and grip together, FIG. 15. The semicircular shape of the channel may also grant the additional advantage of allowing multiple size of grip devices.

The channel arm is tapered so that they form an extrusion at one side 112 and form a depression 113 at the other side of the clamp assembly. The channel and grove are parallel to and face the outer surface of the curved body portion and together form a longitudinal channel for inter-connecting a secondary half clamp assembly, FIG. 21.

Figure 3:
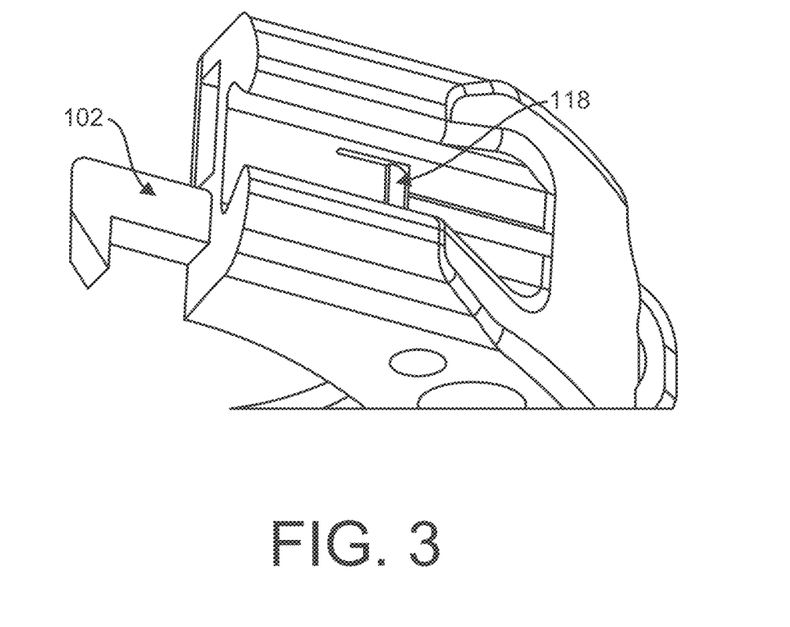
FIG. 3 illustrates the locking mechanism as snap-fit tabs for interconnection.
Figure 4:
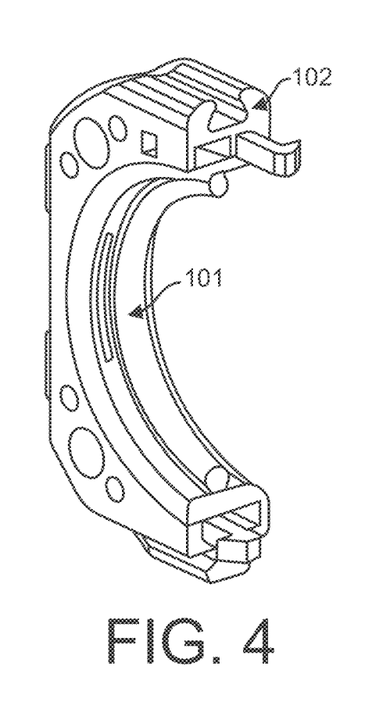
FIGS. 4 and 5 illustrate the grip channel from a half clamp embodiment.
Figure 5:
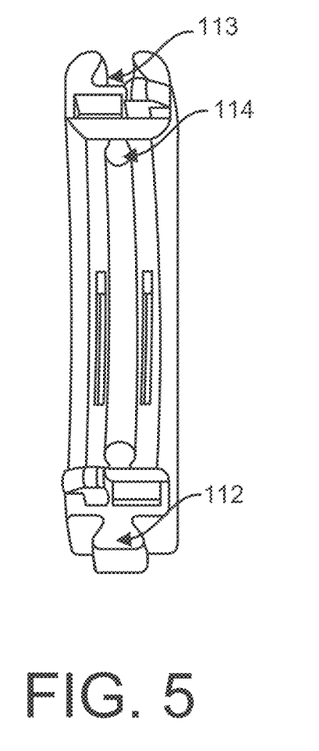
Figure 6:
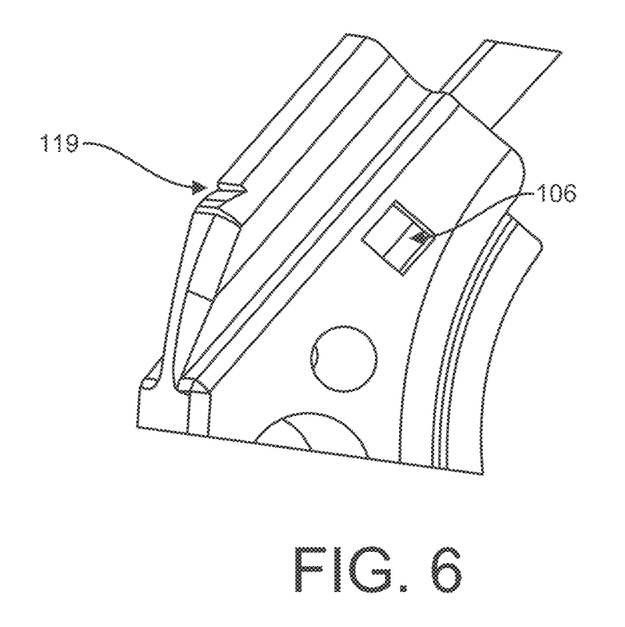
Figure 7:
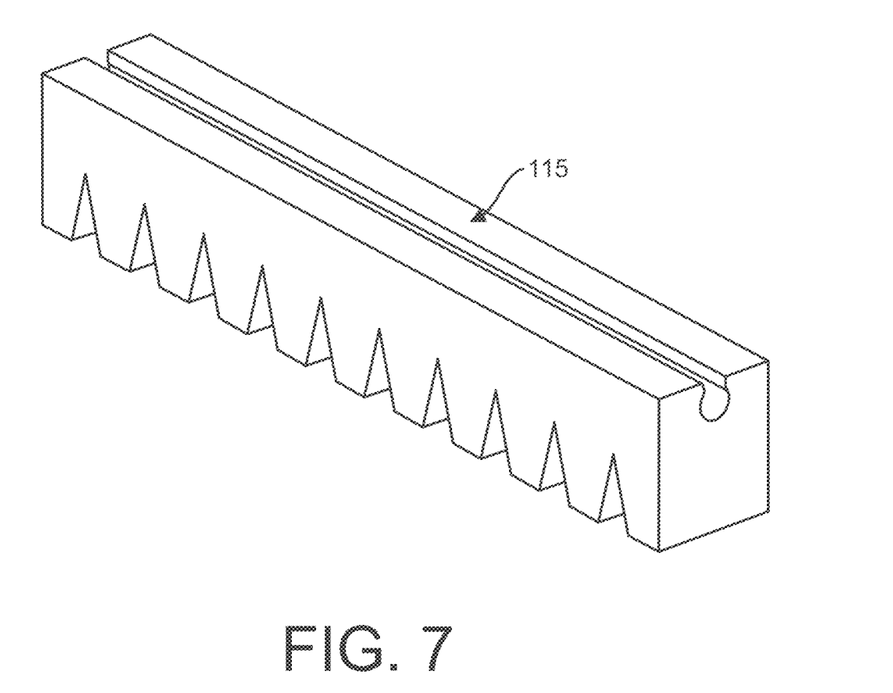
FIGS. 7 and 8 illustrate the grip strips with open channel for fitting unto a clamp embodiment.
Figure 8:
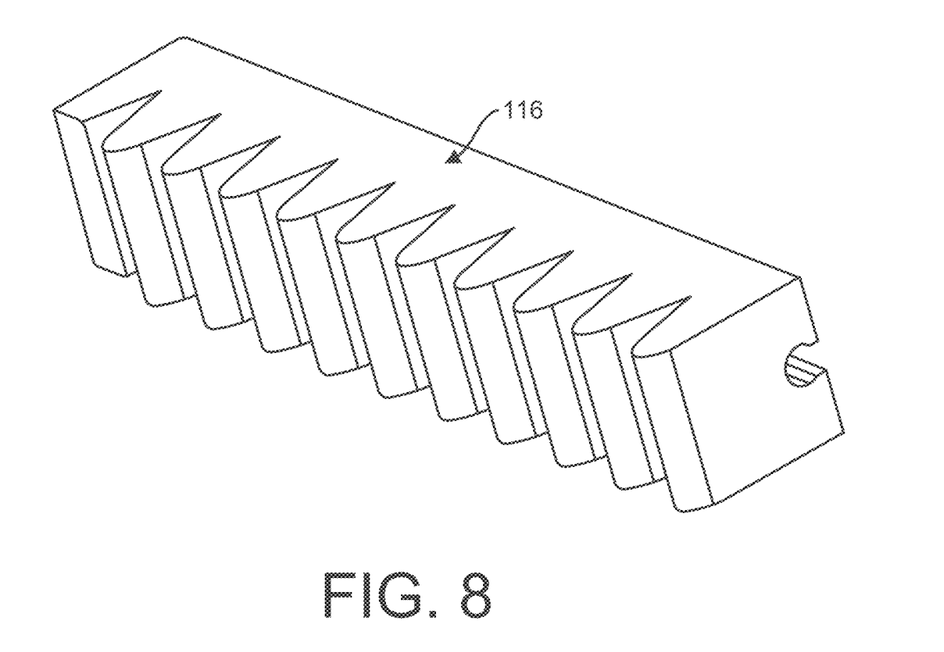
Figure 9:
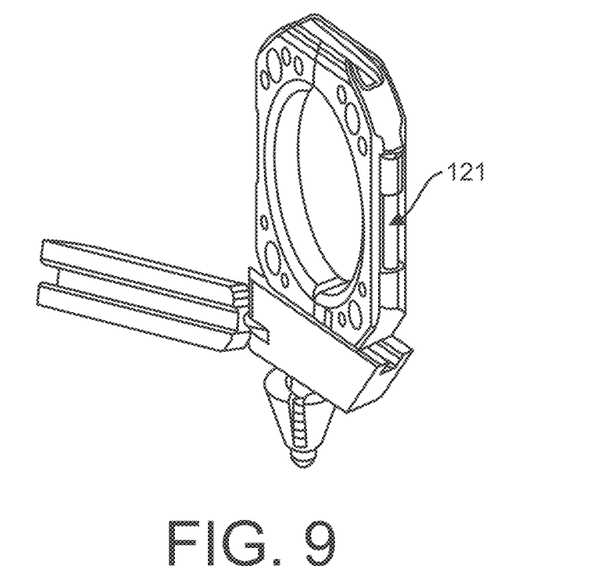
FIGS. 9 and 10 illustrate a fully assembled interconnecting clamp embodiment mounted and an independent base that uses a pressure fastener and securing non-metallic nut.
Figure 10:
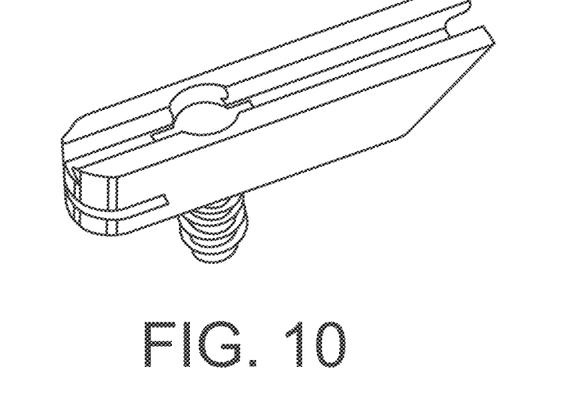

At the grove portion or internal ramp, a notch with a snap-fit tab or lip 118 is designed to be complementary in shape to the locking support 119 to have a ramp and a flat section, FIGS. 3 and 6. Accordingly, the ramp is angled downward toward the front of the second complementary half clamp assembly to form a receiving space. The locking support slides along the ramp as the first half complementary clamp assembly is brought into contact with the second half complementary tab assembly. The notch is preferably at the distal end of the ramp. When the first half assembly and the second half assembly are brought together, the latch 118 slides into the notch 119, such that, when the first half assembly and the second half assembly are fully engaged, the locking tab assemblies are in an interlocked configuration, flush against one another. The latch engages the notch to cooperatively hold the clamp assemblies, together.

The grips 115, 116, or 117 may be molded from any plastic or rubber known in the art as long as the material is flexible enough to allow the curved body portion to flex and to permit support to the wire bundles there between, and also for the complementary snap-fit tab assembly 102 to come together and interlock with the second half complementary snap-fit tab assembly without deforming permanently. Exemplary types of plastic used may be polyethylene, polypropylene, polyvinyl, malemides, polyamide, polyaryletherketone and various plasticized combinations of such materials.

Grip material for the smart clamp should be soft enough so the material does not chafe into the wires that are being held in place, and hard enough so it can remain abrasion resistant. Grip material should be able to reduce noise due to surface contact and provide a strong grip. Grip material should meet the FAA regulations for flame, smoke, and toxicity and should remain an integral part of the smart clamp through required manufacturing, bonding or assembly processes. The grip material may be similar to the smart clamp material or could be different to meet requirements of end use application and cost implications.

In one of the embodiments, the interconnecting clamp and the grip are mostly comprised of thermoplastics and thermoset materials:

TABLE 1

| Clamp material | Grip material |
|---|---|
| Thermoplastic material options: | |
| Polyetherimide (Ultern) or blends | Silicone or blends |
| FAA approved<br>3D printable<br>High temperature and chemical resistance<br>Polycarbonate (Lexan FST) or blends | High temperature and chemical resistance<br>Transplarent<br>Liquid injection over-molding on clamp<br>or Cut-to-size strip and bond to clamp body<br>Fluroelastomers or blends |
| FAA approved<br>3D printable<br>Transparent | High temperature and chemical resistance<br>Cut-to-size strip and bond to clamp body<br>Siltem or blends of material with<br>siloxane in backdone of polymer chain. |
| | High temperature and chemical resistance<br>Softness to reduce noise due to other surfaces<br>Process through injection molding or extrusion.<br>Injection over-molding or Cut-to-size strip and<br>bond to clamp body. |
| Thermoset material options: | |
| Polyamidelmid | Polyamidelmid |
| Higher curing for clamp body<br>Same material can be used for grip. | Higher curing for clamp body<br>Same material as used for clamp body<br>Local curing can be modified to achieve softness<br>in grip and hardness in damp. |
| Epoxy or Polyamide with<br>elastomer particles | Epoxy or Polyamide with<br>elastomer particles |

Figure 25:
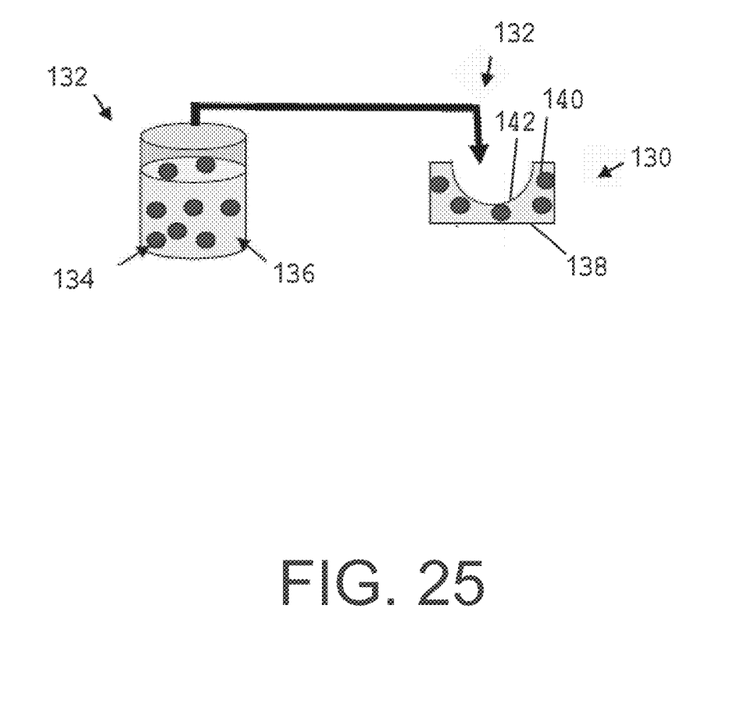
FIG. 25 illustrates a formation of a clamp using epoxy and elastomer.

FIG. 25 illustrates a formation of a clamp 130 using a mixture 132 of a polyimide or epoxy 134, and a dissolvable elastomer 136. The mixture 132 is poured or injected into a mold 138 to form the clamp 130. Phase separation during curing of the polyimide or epoxy 134 results in particles 140 of the elastomer 136 migrating toward a desired location to form a grip 142.

Figure 21:
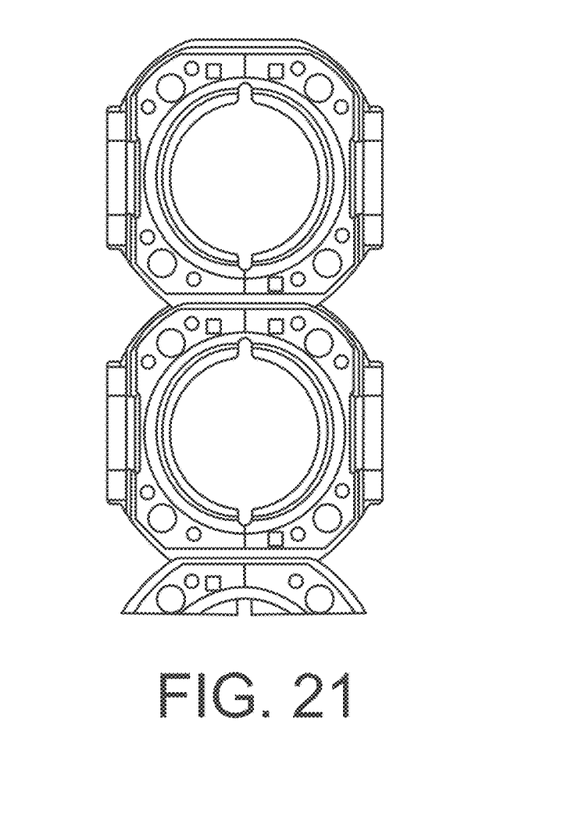
FIG. 21 illustrates a group of clamps interconnected to each other.
Figure 22:
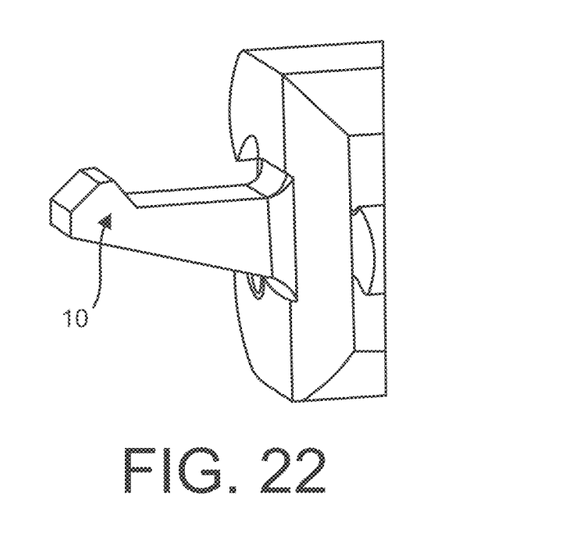
FIG. 22 illustrates a snap tab.

In one embodiment, a clip 120 being a friction fit that would use a rod 121 to latch unto would comprise of one of each on every side, as seen in FIG. 21 and there will be an alternating model to combine clip 122 and latch 123 along each side of the embodiment. This design provides rotation motion on each side of the clamp, along with being symmetrical. The design relies on frictional force to keep it in place once the rod has been placed in the clip.

CONCLUSION

The disclosed embodiments are illustrative, not restrictive. While specific configurations of the smart clamp have been described, it is understood that the present invention can be applied to a wide variety of technical disciplines. There are many alternative ways of implementing the invention. The invention may be configured in a variety of shapes and sizes and is not intended to be limited by the embodiments. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A device for securing aircraft wiring, the device comprising:

a first body having:
  a first end;
  a second end opposite the first end;
  a concave portion extending semi-annularly between the first end and the second end, the concave portion configured to at least partially define a wire-receiving channel;
  a first side adjacent the first end, the first side facing away from the wire-receiving space; and
  a second side adjacent the second end, the second side opposite the first side and facing away from the wire-receiving channel;
a first channel on the first side of the first body, the first channel extending perpendicular to the wire-receiving channel; and a first rail on the second side of the first body, the first rail configured to slide into the first channel, the first rail extending perpendicular to the wire-receiving channel.

2. The device according to claim 1, wherein the first channel has a base surface, the first rail has a notch, and the device further comprises an elastically depressable ramp with a lip, the ramp, lip, and notch configured such that as a result of sliding a rail identical to the first rail into the first channel, the rail identical to the first rail slides against the ramp to depress the lip and then the lip snaps into a notch of the rail identical to the first rail.

3. The device according to claim 2, wherein the base surface of the first channel includes a recess configured to receive the lip and ramp, the recess extending from the ramp to an end of the channel to receive a disassembly tool.

4. The device according to claim 3, further comprising a disassembly tool including a rigid, straight portion configured to extend into the recess to push against the ramp and depress the lip.

5. The device according to claim 4, wherein an end surface at a first end of the rigid, straight portion is angled obliquely with respect to the rigid, straight portion.

\* \* \* \* \*